United States Patent
Kubota

(10) Patent No.: US 8,483,507 B2
(45) Date of Patent: Jul. 9, 2013

(54) IMAGE SENSING APPARATUS AND IMAGE PROCESSING METHOD

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 12/702,904

(22) Filed: Feb. 9, 2010

(65) Prior Publication Data

US 2010/0208105 A1    Aug. 19, 2010

(30) Foreign Application Priority Data

Feb. 17, 2009 (JP) .................................. 2009-034391

(51) Int. Cl.
*G06K 9/40* (2006.01)

(52) U.S. Cl.
USPC .......... 382/274; 382/162; 382/165; 382/167; 348/251; 348/254

(58) Field of Classification Search
USPC .......... 382/162, 165, 167, 274, 254; 358/461; 348/251, 254; 345/690, 691, 692, 693, 694, 345/695, 696, 697, 207; 250/202
See application file for complete search history.

(56) References Cited

U.S. PATENT DOCUMENTS

| | | | |
|---|---|---|---|
| 6,876,399 B1* | 4/2005 | Masuyama et al. | 348/649 |
| 7,907,135 B2* | 3/2011 | Kuwabara et al. | 345/207 |
| 2006/0274386 A1* | 12/2006 | Wakazono et al. | 358/518 |
| 2007/0053607 A1* | 3/2007 | Mitsunaga | 382/274 |
| 2007/0070214 A1* | 3/2007 | Nakamura | 348/222.1 |
| 2007/0081721 A1* | 4/2007 | Xiao et al. | 382/167 |
| 2009/0129669 A1* | 5/2009 | Imai | 382/167 |

FOREIGN PATENT DOCUMENTS

| | | |
|---|---|---|
| JP | 2007-124604 | 5/2007 |
| JP | 2008-072604 | 3/2008 |

* cited by examiner

*Primary Examiner* — Ali Bayat
(74) *Attorney, Agent, or Firm* — Cowan, Liebowitz & Latman, P.C.

(57) ABSTRACT

An image sensing apparatus executes a plurality of tone corrections respectively suited to different luminance distributions of images. The image sensing apparatus analyzes a luminance distribution of sensed image data, selects, based on an analysis result, at least one of a first tone correction which suppresses luminance saturation of image data, a second tone correction which converts luminance values of all luminance regions so that a maximum luminance value of sensed image data becomes a largest possible luminance value of the image data, and a third tone correction which multiplies a luminance value of a low-luminance region, which is set in advance, of sensed image data by a gain larger than gains of other luminance regions, as a tone correction to be implemented for sensed image data, and limits, when a correction based on the second tone correction is selected, implementation of a correction based on the third tone correction.

21 Claims, 13 Drawing Sheets

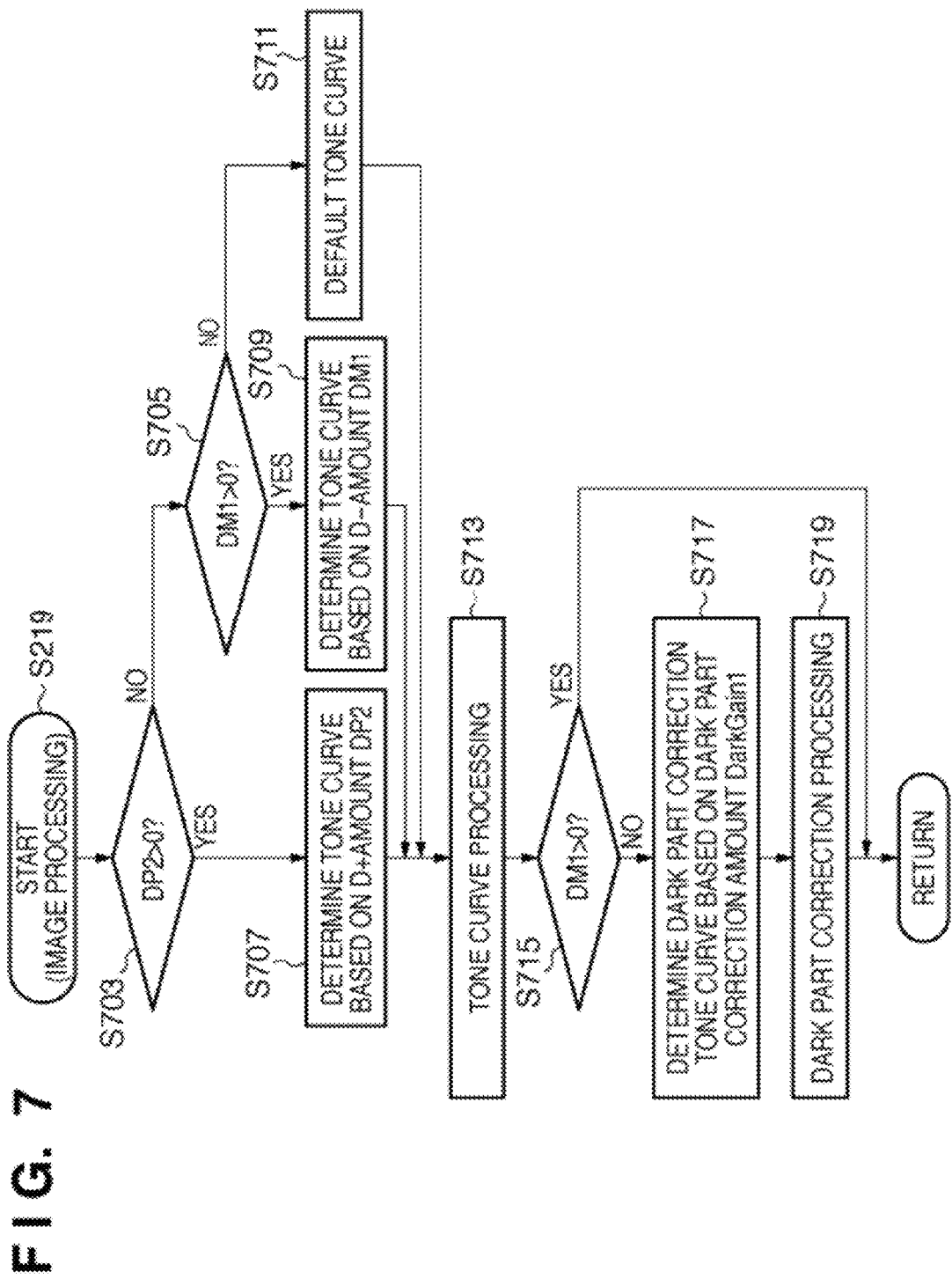

BEFORE DARK PART CORRECTION

AFTER DARK PART CORRECTION

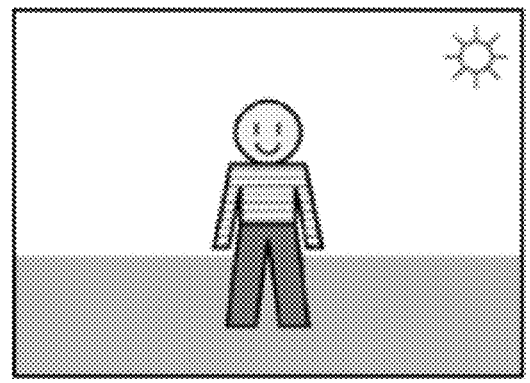
F I G. 10A
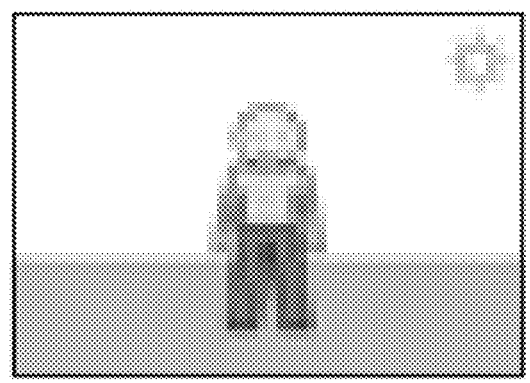
F I G. 10B
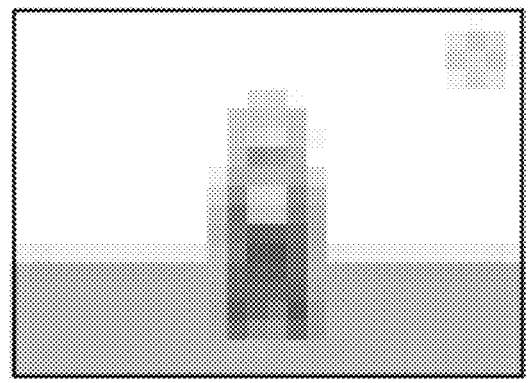
F I G. 10C

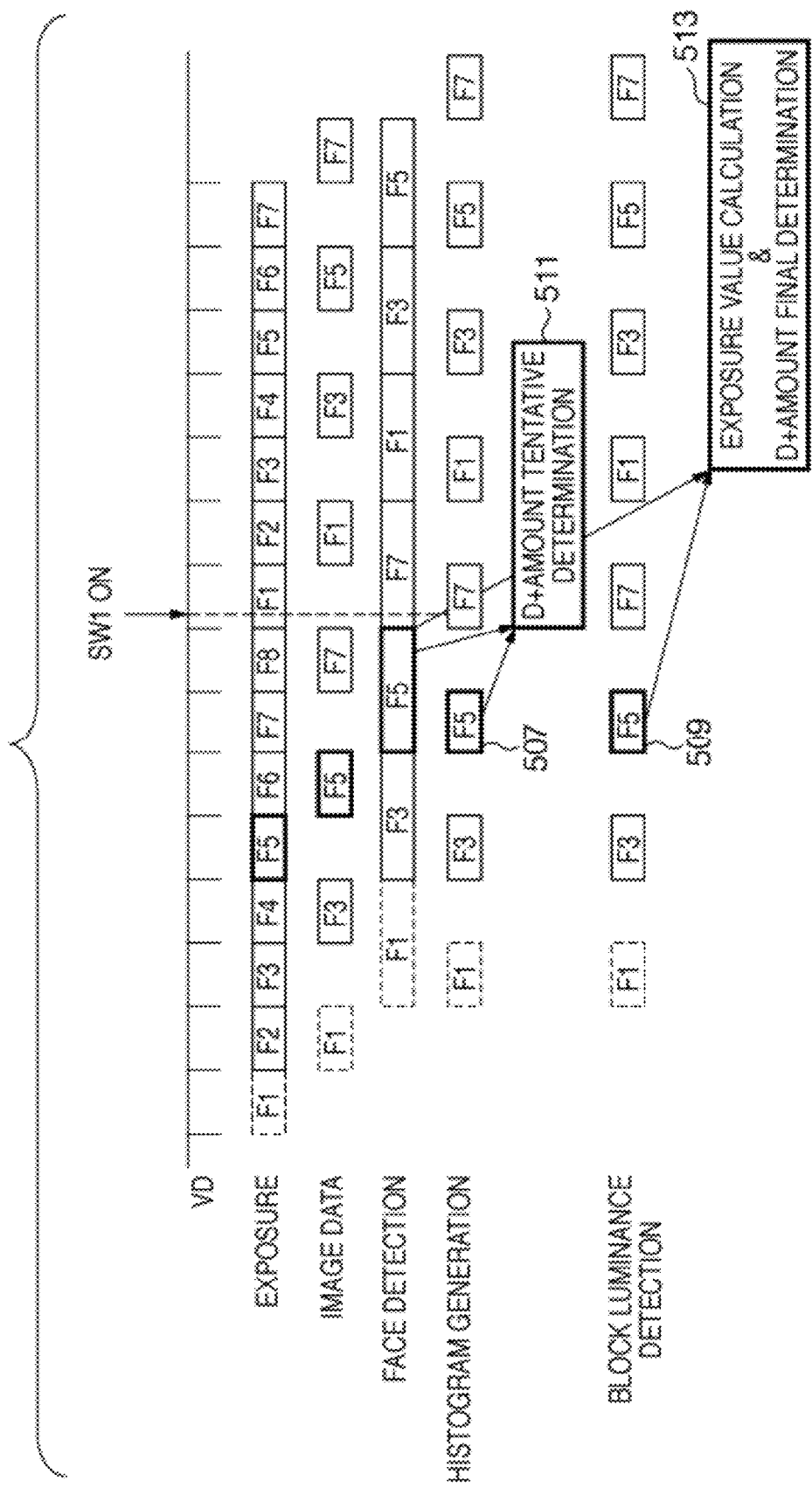

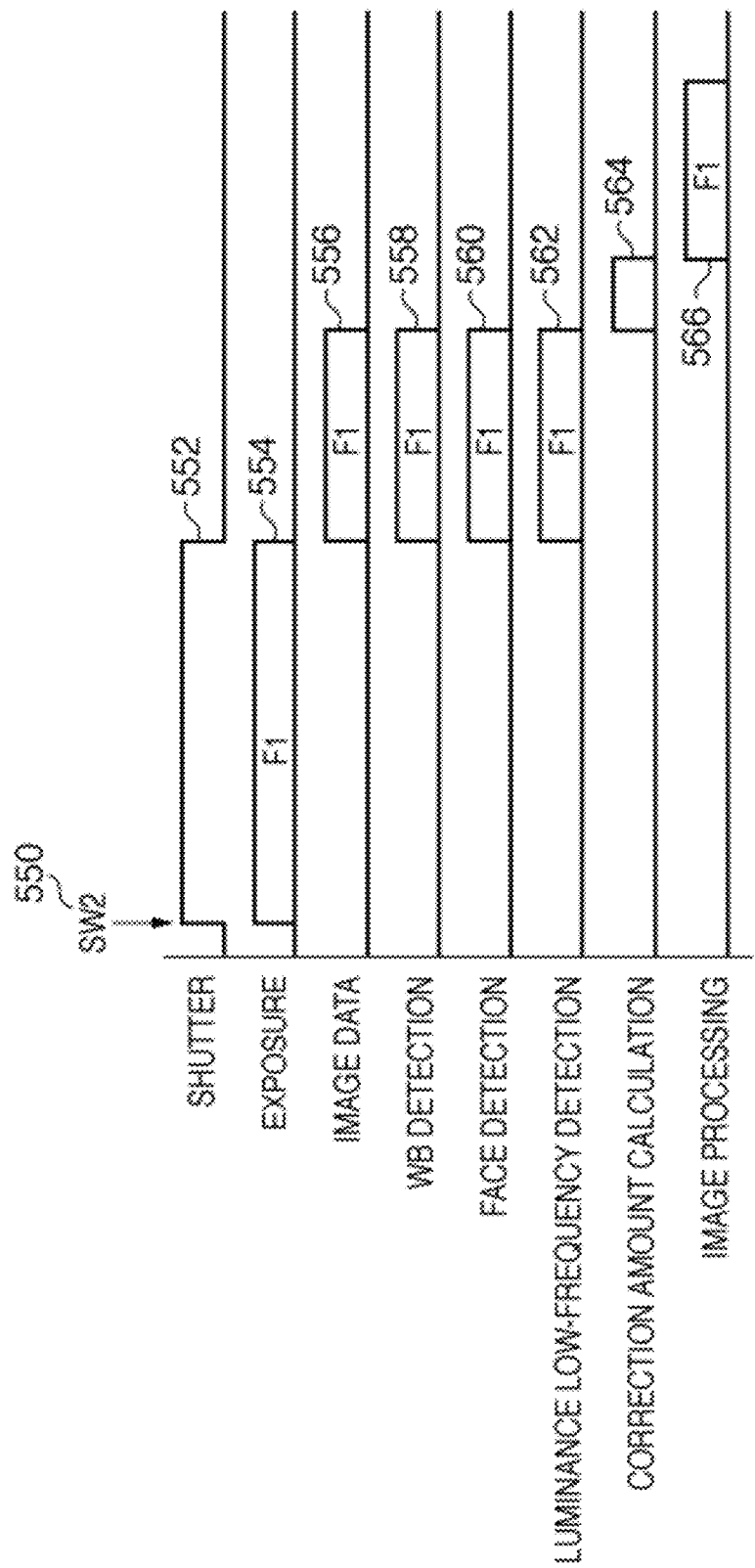

IMAGE SENSING APPARATUS AND IMAGE PROCESSING METHOD

BACKGROUND OF THE INVENTION

1. Field of the Invention

The present invention relates to a tone correction technique for an image.

2. Description of the Related Art

Conventionally, a method is known for executing tone correction by analyzing the luminance histogram and object information of an acquired image so as to obtain an image with a favorable brightness and contrast.

In particular, in a so-called backlight scene in which the brightness of a main object is considerably darker than that of a background, since a main object part of a sensed image becomes dark, it is effective to apply tone correction to such images. Also, as for a so-called "highlight-detail loss" in which the brightness of a background becomes considerably brighter, the following method is available. Initially, in a stage of exposing an image sensor, an image is sensed to have an exposure value relatively darker than a proper exposure value so as to suppress a highlight-detail loss. Then, using a correction table (tone curve) which converts the luminance values of obtained image data to predetermined output luminance values, tone correction is applied so that the levels of luminance values of a region which is sensed to be relatively darker are corrected to proper levels, and the levels of luminance values of a region which is sensed to be already bright remain unchanged. This method is known to be effective for digitally enhancing the dynamic range of the image sensor (for example, see Japanese Patent Laid-Open No. 2007-124604).

A method of obtaining a so-called shading-like effect by applying tone correction using low-frequency component signals of luminance components of an image has been proposed. With this method, tone correction that makes an object, which is sensed to be darker, be brighter while maintaining the contrast of an image can be executed (for example, see Japanese Patent Laid-Open No. 2008-072604).

On the other hand, since auto exposure control determines an exposure value to obtain a predetermined luminance level even when a frame includes a white part like a white wall or snow scene, an object which is originally white may often be sensed to have a color closer to gray. As is known, by applying tone correction to an image of such scene so that when there are a few or no high-luminance components, an output luminance region to be assigned to an input high-luminance region is narrowed down to skip tone assignment to an unnecessary luminance region, an effect of sensing a white object intact is obtained.

However, when tone correction is applied using the tone curve so that an image dark part is corrected to be brighter and correction for an originally bright part is suppressed, as described in Japanese Patent Laid-Open No. 2007-124604, the contrast in an intermediate luminance region between a main object and background is lost, resulting in a flat image.

On the other hand, when tone correction is applied using low-frequency component signals of luminance components of an image, as described in Japanese Patent Laid-Open No. 2008-072604, too much contrast is obtained depending on scenes, resulting in an unnatural image.

SUMMARY OF THE INVENTION

The present invention has been made in consideration of the above situation, and applies tone correction suited to a sensed image in accordance with the luminance distribution of the image without causing any image quality deterioration.

According to the present invention, provided is an image sensing apparatus comprising:

a first tone correction unit which applies a tone correction that suppresses luminance saturation of image data;

a second tone correction unit which applies a tone correction by converting luminance values of all luminance regions so that a maximum luminance value of sensed image data becomes a largest possible luminance value of the image data;

a third tone correction unit which applies a tone correction by multiplying a luminance value of a low-luminance region, which is set in advance, of sensed image data by a gain larger than gains of other luminance regions;

an analysis unit which analyzes a luminance distribution of sensed image data;

a selection unit which selects at least one of tone corrections applied by the first, second, and third tone correction units as the tone correction to be implemented for sensed image data based on an analysis result of the analysis unit; and a limiting unit which limits, when the tone correction by the second tone correction unit is selected, implementation of the tone correction by the third tone correction unit.

According to the present invention, provided is an image processing method, which executes a plurality of tone correction methods respectively suited to different luminance distributions of images, comprising:

an analysis step of analyzing a luminance distribution of sensed image data;

a selection step of selecting, based on an analysis result in the analysis step, at least one of a first tone correction which suppresses luminance saturation of image data, a second tone correction which converts luminance values of all luminance regions so that a maximum luminance value of sensed image data becomes a largest possible luminance value of the image data, and a third tone correction which multiplies a luminance value of a low-luminance region, which is set in advance, of sensed image data by a gain larger than gains of other luminance regions, as a tone correction to be implemented for sensed image data; and a limiting step of limiting, when a correction based on the second tone correction is selected, implementation of a correction based on the third tone correction.

Further features of the present invention will become apparent from the following description of exemplary embodiments (with reference to the attached drawings).

BRIEF DESCRIPTION OF THE DRAWINGS

FIG. 7 is a flowchart showing the sequence of image processing according to the embodiment of the present invention;

FIGS. 10A to 10C are views showing resolution conversion states for dark part correction according to the embodiment of the present invention;

FIG. 13 is a timing chart showing the timings of processes before and after SW1=ON associated with a D+ amount calculation according to the embodiment of the present invention; and FIG. 14 is a timing chart showing the timings of tone correction processing after SW2=ON according to the embodiment of the present invention.

DESCRIPTION OF THE EMBODIMENTS

Preferred embodiments of the present invention will be described in detail in accordance with the accompanying drawings.

Arrangement of Image Sensing Apparatus

Figure 1:
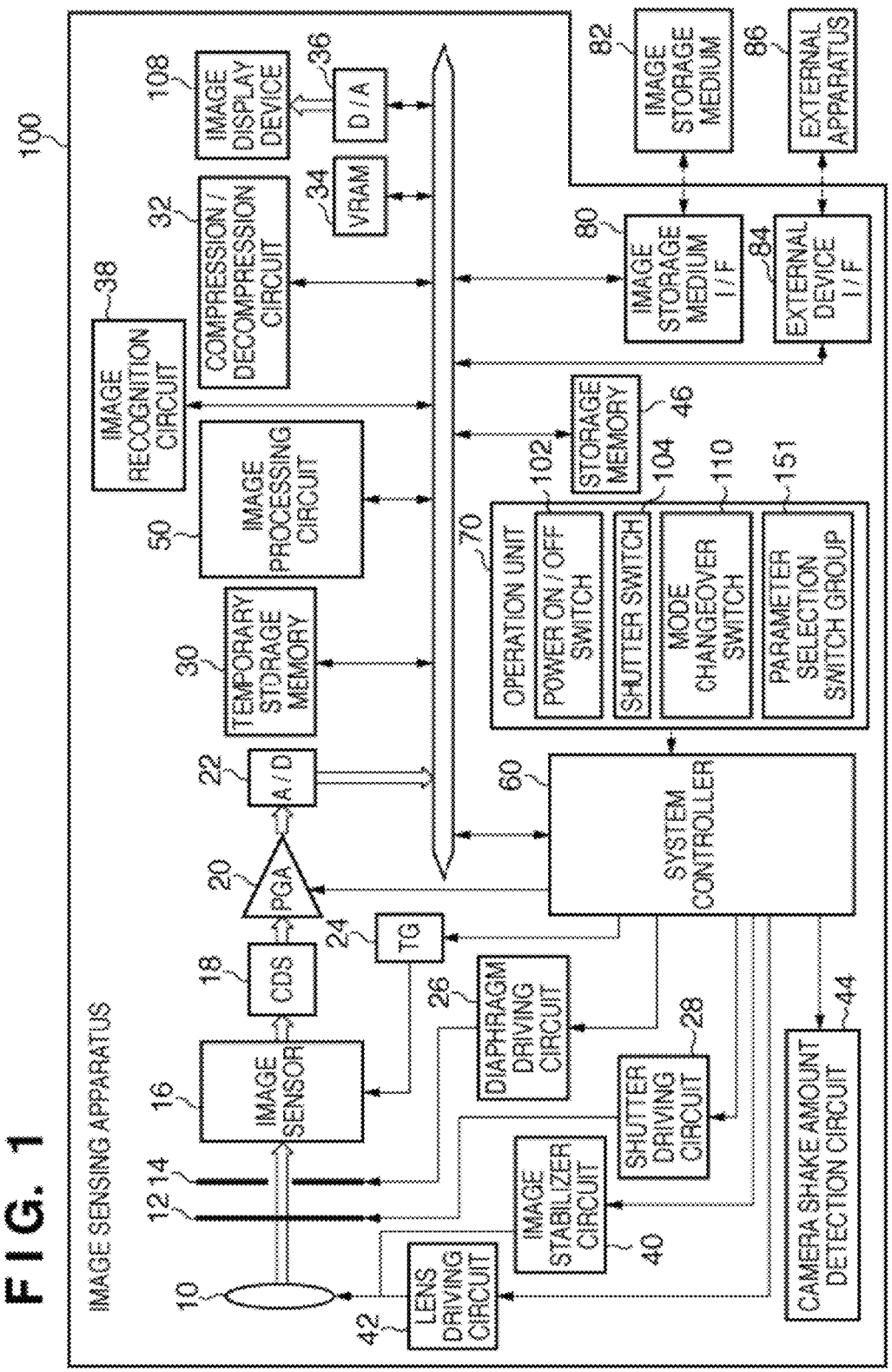
FIG. 1 is a block diagram showing the arrangement of an image sensing apparatus according to an embodiment of the present invention.

FIG. 1 is a block diagram showing the arrangement of an image sensing apparatus 100 according to an embodiment of the present invention.

Referring to FIG. 1, reference numeral 60 denotes a system controller which controls the operation of the overall image sensing apparatus 100.

Reference numeral 10 denotes a photographing lens which collects external light. FIG. 1 illustrates one lens as the photographing lens 10, but the photographing lens 10 normally includes a plurality of lenses. The photographing lens 10 includes a focus lens which is used to adjust a focus when, for example, it is reciprocally moved along an optical axis by a lens driving circuit 42, and a zoom lens which is used to adjust an angle of view. Furthermore, the photographing lens 10 includes an image stabilizer lens which attains optical image stabilization when it is moved by an image stabilizer circuit 40 so as to shift its optical axis in a direction to cancel a camera shake based on a camera shake amount measured by a camera shake amount detection circuit 44. The image sensing apparatus 100 adopts a collapsible lens barrel including the photographing lens 10 to reduce the main body volume when a camera is not in use, thus improving portability.

Note that the camera shake amount detection circuit 44 includes a gyro sensor, and image stabilization is attained by driving the lens in FIG. 1. Alternatively, image stabilization can be similarly attained by driving an image sensor 16 (to be described later).

Reference numeral 12 denotes a mechanical shutter (to be simply referred to as a "shutter" hereinafter). The system controller 60 can control the shutter 12 by supplying mechanical shutter control information to a shutter driving circuit 28. An exposure time at the time of still image shooting is determined by an open/close time of the shutter 12. The system controller 60 judges this open/close time and issues an instruction to the shutter driving circuit 28.

Reference numeral 14 denotes a diaphragm used to adjust the quantity of light which has passed through the photographing lens 10. The diaphragm 14 includes an iris diaphragm formed by a plurality of blades, and a circular aperture formed by punching a plate to form holes with various diameters in advance. The system controller 60 can control the diaphragm 14 by supplying diaphragm control information to a diaphragm driving circuit 26. The system controller 60 controls the diaphragm 14 and diaphragm driving circuit 26 to drop the quantity of light by stopping down the diaphragm when an object luminance is high, and to take in light in larger quantities by opening the diaphragm when an object luminance is low.

Reference numeral 16 denotes an image sensor such as a CCD or CMOS sensor, which converts an optical image of an object, which enters via the photographing lens 10, shutter 12, and diaphragm 14, into an electrical signal (image signal), and outputs the electrical signal. The system controller 60 can control the image sensor 16 by supplying an image sensor control signal to a TG (Timing Generator) 24.

The TG 24 drives the image sensor 16 based on control information received from the system controller 60. The image sensor 16 periodically executes a charge accumulation operation and accumulated charge read operation for each pixel with reference to a driving signal from the TG 24. Of charges accumulated on the image sensor 16, only those on specific lines or a specific area can be read out. Such read process can be realized by changing a read method based on a read control pulse output from the TG 24. The system controller 60 determines an optimal read method depending on the situation, and issues an instruction to the TG 24. For example, the system controller 60 selectively uses the read methods in such a manner that at the time of still image shooting, all data of the image sensor 16 are read out because a high resolution is required; in case of an electronic viewfinder or at the time of moving image shooting, only specific lines are decimated and read out because a high frame rate such as 30 fps or 60 fps is required. The system controller 60 can control the exposure time of the image sensor 16 via the TG 24. Such control can be attained when the TG 24 outputs a driving signal to the image sensor 16 at an arbitrary timing to clear charges charged by the image sensor 16.

Reference numeral 18 denotes a Correlated Double Sampler (CDS) circuit which removes noise components of image data by applying a correlated double sampling method to the electrical signal (image signal) output from the image sensor 16. Reference numeral 20 denotes a Programmable Gain Amplifier (PGA) circuit which attenuates/amplifies the level of image data. The amplification amount of the PGA circuit 20 is controlled by the system controller 60, to be described later. Normally, in order to obtain image data with a proper level, the image sensor 16 is properly exposed by setting a proper quantity of light incident on the image sensor 16 using the diaphragm 14 and setting a proper exposure time using the shutter 12. In addition, the PGA circuit 20 can assume a role of digitally changing an exposure amount of image data by attenuating/amplifying an image data signal. Such function can be provided to the user as a concept called sensitivity (film speed) as one of exposure conditions at the time of shooting including the aperture value and shutter speed.

Image data processed by the PGA circuit 20 is converted by an A/D (Analog/Digital) circuit 22 from an analog signal into a digital signal. As the bit width of a digital signal, 10 bits, 12 bits, 14 bits, and the like are used depending on devices. An image processing circuit 50 in a subsequent stage can cope with a plurality of types of bit widths. FIG. 1 illustrates the CDS circuit 18, PGA circuit 20, and A/D circuit 22 as independent components, but one IC package which mounts the functions of these circuits may be adopted.

The digital image data output from the A/D circuit 22 is input to the image processing circuit 50. The image processing circuit 50 includes a plurality of blocks, and implements various functions.

For example, the image sensor 16 normally extracts light of a specific color component for respective pixels via color filters, and photoelectrically converts the extracted light. An image signal output from the A/D circuit 22 has a data format corresponding to pixel and color filter layouts of the image sensor 16, and is not suited to use in auto exposure control (AE) which implements exposure control by evaluating only luminance components. Hence, the image processing circuit 50 has a function of extracting only luminance information by excluding color information from the image signal.

Furthermore, the image processing circuit 50 has a function of extracting only frequency components of an image signal read out from the image sensor 16, and can use them at the time of auto focus control (AF). The image processing circuit 50 has a function of determining an area, from which frequency components are to be extracted, of an image signal read out from the image sensor 16, or of dividing the area of the image sensor 16. In this AF processing, the image sensor 16 can be driven to be suited to focus adjustment. In case of TV AF using the image sensor 16, since the focus lens is driven to a new focus position every time an image signal is read out from the image sensor 16, the focus lens can be quickly moved to many focus positions as the frame rate of the image sensor 16 is higher. For this reason, the image sensor 16 can be driven at a higher frame rate only in an AF mode. Conversely, by setting a lower frame rate to read out more pixel data from the image sensor 16, the number of data that can undergo frequency analysis in the image processing circuit 50 increases, thus allowing more accurate focus adjustment control. Such use method of the image sensor 16 can be adaptively determined according to the shooting mode of the camera and the brightness of an object.

Moreover, the image processing circuit 50 has a function of manipulating an increase/decrease in level of digital image data converted by the A/D circuit 22, a color effect of an image, and the like, and also assumes a role of adjusting the image quality of a sensed image. As for the level of image data, a function of increasing/decreasing the level at an even amplification factor for the entire image, and a tone curve (gamma) function of converting a signal level according to the magnitude of an original signal level are available. In addition, various level adjustment functions such as a function of increasing/decreasing the level at an amplification factor according to the frequency components of respective areas in a frame are available.

The digital image data converted by the A/D circuit 22 is input to the image processing circuit 50, and can be stored in a temporary storage memory 30 at the same time. The image data temporarily stored in the temporary storage memory 30 can be read out again, and the system controller 60 can refer to image data and can input readout image data to the image processing circuit 50. Furthermore, image data which has undergone image processing by the image processing circuit 50 can be written back to the temporary storage memory 30 or to a storage memory 46, and the system controller 60 can write arbitrary data in the temporary storage memory 30 and the storage memory.

The image data properly processed by the image processing circuit 50 can be input to an image recognition circuit 38. The image recognition circuit 38 can recognize human faces and their expressions, and text information if characters are included, in addition to recognition of the brightness state, focus state, and color state of an input image. A plurality of images can be input to the image recognition circuit 38. For example, two images are input to the image recognition circuit 38 to compare their features, so as to determine if these images are identical. In addition to the image recognition processing in the image recognition circuit 38, the system controller 60 can also execute image recognition processing. The system controller 60 can execute a program, which is stored in, for example, in the storage memory 46 and encoded in advance, on a CPU. The system controller 60 can read out image data stored in the temporary storage memory 30, and can recognize a scene state by analyzing that image data.

Reference numeral 70 denotes an operation unit, which includes a power ON/OFF switch 102, shutter switch 104, mode changeover switch 110, and parameter selection switch group 151. The shutter switch 104 is used to issue shooting preparation and shooting start instructions by two stroke operations, that is, a half stroke operation (SW1) and a full stroke operation (SW2). In case of an image sensing apparatus which executes AE control and AF control, upon pressing the shutter switch 104 to a half stroke position (SW1=ON), AE control and AF control are executed as shooting preparation. Upon pressing the shutter switch 104 to a full stroke position (SW2=ON), a still image shooting instruction or image recognition instruction can be issued. The mode changeover switch 110 is used to switch camera operation modes such as a still image shooting mode, moving image shooting mode, and play mode. In this embodiment, the mode changeover switch 110 is expressed as a member that allows to switch several modes, but it may also be used to switch many still image modes such as a landscape shooting mode and portrait shooting mode, which are optimized to specific shooting scenes. Parameter selection switches 151a to 151e allow the user to select shooting conditions at the time of shooting such as distance measurement regions and a photometry mode, to turn pages at the time of playback of sensed images, and to select general operation settings of the camera. Also, these switches allow the user to select On/Off of the aforementioned electronic viewfinder. An image display device 108 displays an image, and may also serve as an input device as a touch panel.

Reference numeral 108 denotes an image display device such as an LCD. When an image is output to the image display device 108, image data which has undergone the image processing by the image processing circuit 50 is mapped on a VRAM 34, and is converted by a digital/analog (D/A) circuit 36 into analog data to be displayed. An electronic viewfinder function can be implemented when successive images read out from the image sensor 16 are sequentially displayed and updated on the image display device 108. The image data can be mapped on the VRAM 34 to cope with various display modes, so as to display one image data on the image display device 108 to have a maximum size or to display a plurality of images on multi-windows.

The image display device 108 can display not only an image but also arbitrary information solely or together with an image. The image display device 108 can also display a camera status, text information including a shutter speed, aperture value, and sensitivity information, which are selected by the user or determined by the camera, a histogram like a luminance distribution measured by the image processing circuit 50, a face recognition result, a scene recognition result, and so forth. The display positions and display colors of pieces of information can be arbitrarily selected. By displaying such various kinds of information, the image display device 108 can serve as a user interface. The image display device 108 can also display image data stored in an image storage medium 82. When image data is compressed, a compression/decompression circuit 32 decompresses that image data, and the decompressed data is mapped on the VRAM 34. The mapped data is converted by the D/A circuit 36 into analog data, which is output.

Note that a conventional optical viewfinder can also be additionally arranged. In such case, the electronic viewfinder function is turned off to use the optical viewfinder, thus saving consumption power.

The image storage medium 82 is nonvolatile, and can mainly store sensed image data via an image storage medium interface 80. As for storage of image data, for example, a hierarchy of folders may be formed, and file names are assigned in ascending order of shooting. To each image data, shooting information such as an aperture value, shutter speed, and ISO speed, a shooting time, and the like can be appended, and can be stored together with the image data. Furthermore, the stored image data can be read out, and can also be copied, moved, or deleted.

Reference numeral 86 denotes an external apparatus such as a printer, PC, or display apparatus, which is connected via an external device interface 84.

A tone correction method of this embodiment, which is executed in the image sensing apparatus 100 with the aforementioned arrangement, will be described below. This embodiment will explain cases using the following three types of tone correction methods.

(1) First Tone Correction Method

This embodiment adopts, as the first tone correction method, a tone correction method which suppresses a highlight-detail loss (saturation) on the high luminance side in a scene including both a low-luminance object and high-luminance object. The first tone correction method will be referred to as "D+ correction" hereinafter.

More specifically, an aperture value, shutter speed, gain amount, and the like are normally determined as shooting conditions prior to shooting. At this time, the image sensing apparatus attempts to sense an image to have a proper exposure value according to luminance information of a frame and the presence/absence of a human face. However, the dynamic range of the image sensor is not so broad. Hence, in a backlight scene upon sensing an image of a person who stands against a backdrop of sun, the sensed image of that person is too dark or that of the background is too bright irrespectively of the setting values of the aperture value, shutter speed, and gain. The D+ correction eliminates a phenomenon of such too bright background.

In the D+ correction, an image is sensed using an exposure value corresponding to underexposure so as not to cause any highlight-detail loss of a high-luminance part, and the obtained image data is corrected using a gamma curve (tone curve) which is set to raise the luminance level of a low-luminance part of that image data.

(2) Second Tone Correction Method

Figure 8A:
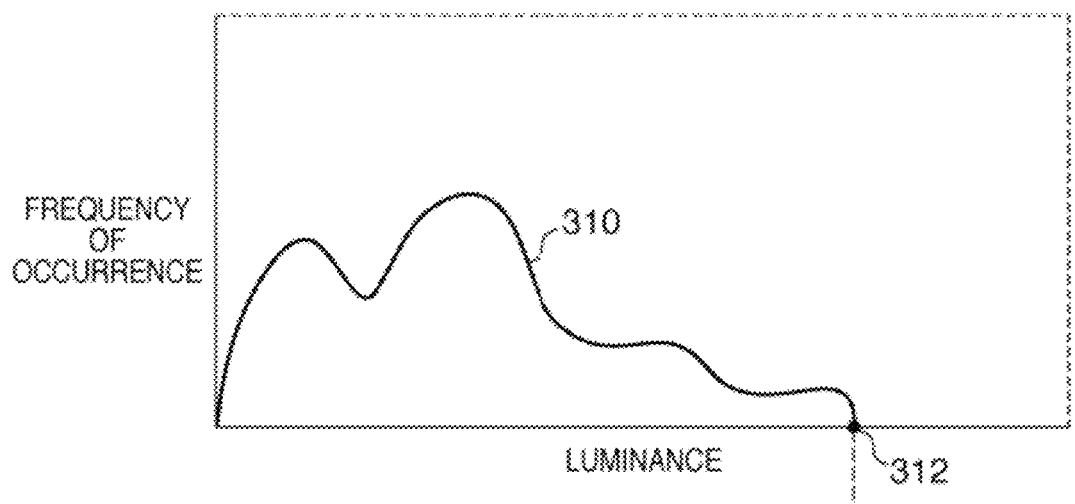
FIGS. 8A and 8B are graphs for explaining an overview of D− correction according to the embodiment of the present invention.

This embodiment adopts, as the second tone correction method, a tone correction method which does not make any unnecessary tone assignment depending on the state of luminance data of a high-luminance region of a sensed image. This second tone correction method will be referred to as "D− correction" hereinafter. FIG. 8A is a graph showing an example of a histogram of a scene for which the D− correction is effective. When a frame includes an even luminance distribution from a low-luminance region to a high-luminance region, the histogram shown in FIG. 8A is not formed. In FIG. 8A, the high-luminance side does not include any luminance distribution, and it is determined that luminance differences in the frame are not so large.

Figure 8B:
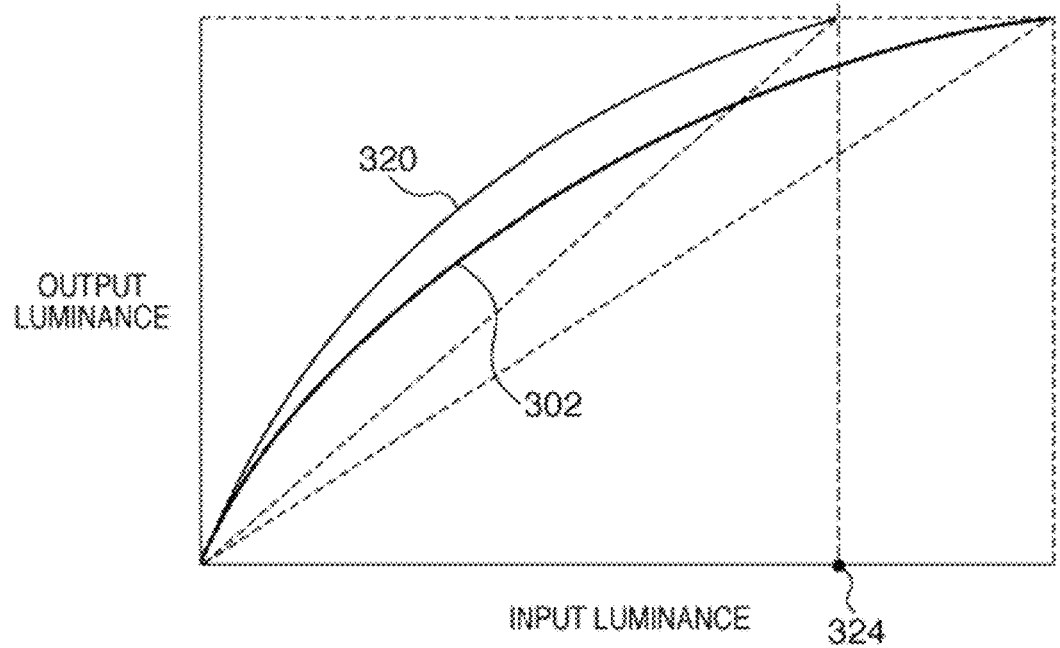

When the luminance distribution extends over a broad range, a gamma curve like a normal gamma curve 302 shown in FIG. 8B is set so as to assign output luminance values to every input luminance values. However, when there is no distribution in the high-luminance region like in the histogram shown in FIG. 8A, effective tone expression cannot be attained by assigning an output luminance value to the input luminance value of the high-luminance region. Therefore, a gamma curve like a D− gamma curve 320 shown in FIG. 8B, which has, as an upper limit of an input luminance value, a luminance value 312 as a maximum luminance value of the distribution included in the histogram, and assigns the luminance value 312 to a largest possible luminance value that image data can assume, is set. The D− gamma curve 320 effectively assigns output luminance values to input luminance values up to an input luminance value 324, and does not assign any luminance value to that which exceeds the input luminance value 324. Note that FIG. 8B illustrates a case in which the luminance distribution region completely matches the input luminance assignment range of the D− gamma curve 320. However, upon adopting a method of selecting one of a plurality of D− gamma curves, which are prepared in advance, the input luminance distribution does not often perfectly match the input luminance assignment range of the selected D− gamma curve.

(3) Third Tone Correction Method

This embodiment adopts, as the third tone correction method, a tone correction method which adjusts the luminance levels of a low-frequency and low-luminance region depending on the states of a low-frequency region, luminance information, and the presence/absence of a human face of a sensed image. This third tone correction method will be referred to as "dark part correction" hereinafter.

Figure 9A:
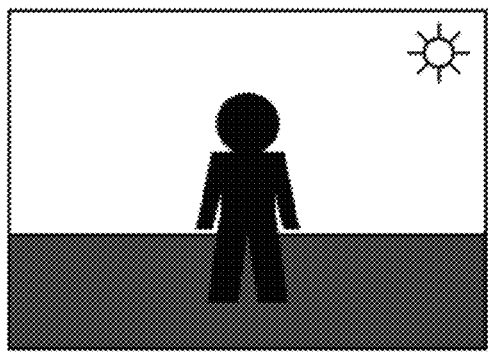
FIGS. 9A and 9B are views for explaining an overview of dark part correction according to the embodiment of the present invention.
Figure 9B:
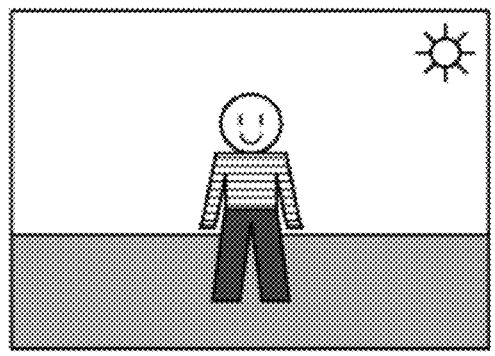

FIGS. 9A and 9B show a scene for which the dark part correction is effective, and an image as a result of the dark part correction of that scene. FIGS. 9A and 9B show a scene in which a person stands against a backdrop of sun. Before the dark part correction, the face and body of that person, the ground, and the like appear dark due to a backlight scene. When tone correction is to be applied using an even tone curve so as to brighten such dark parts, the pupils of that person and the pattern of horizontal stripes in a shirt the person is wearing may often be corrected to be brighter beyond necessity. In such case, a low-quality image with low contrast is unwantedly obtained. Hence, the dark part correction is applied in such a manner that low-frequency luminance components are extracted, and when a low-luminance region has a certain area, the tone correction is executed.

Figure 11:
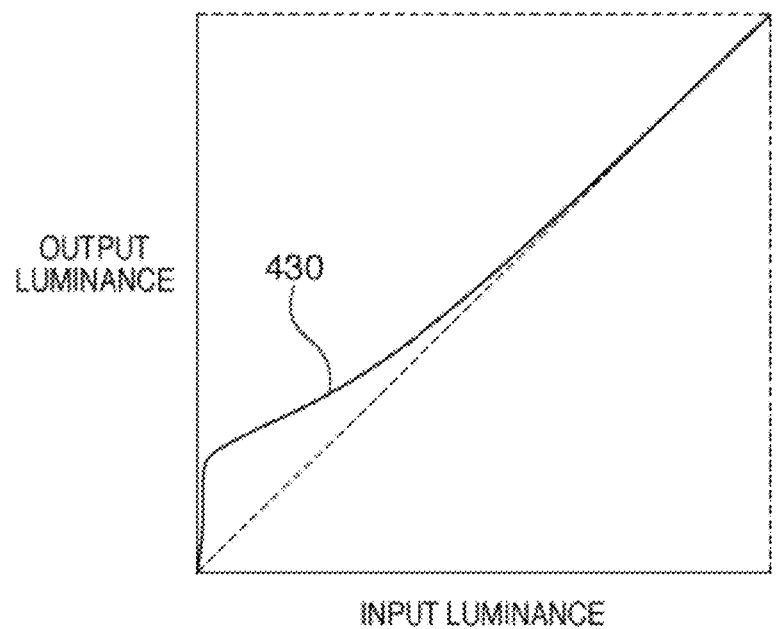
FIG. 11 is a graph showing an example of a tone curve used in the dark part correction according to the embodiment of the present invention.

FIGS. 10A to 10C show this state. In order to extract low-frequency components of an image, images having three different resolutions are generated from an original image in FIGS. 10A to 10C. The resolution of the original image is nearly maintained in FIG. 10A, but the resolution is gradually dropped in the order of FIGS. 10B and 10C. In FIG. 10C, it is difficult to recognize the person. Various degrees of such resolution drops may be set depending on desired dark part correction effects. A dark part correction gamma curve shown in FIG. 11 is applied to these plurality of images. This gamma curve serves as a conversion table which can obtain high output luminance values for a region with low input luminance values. After the respective images undergo the tone correction, the three images are composited by averaging the sum of these images. Then, an effect of weakly applying the dark part correction to regions having a relatively high luminance frequency such as the eyes and the pattern of clothing, but strongly applying the dark part correction to regions with a low luminance frequency such as the trousers and ground is obtained.

Overall Sequence of Correction Processing

The overall sequence for obtaining an image having more appropriate tones using the aforementioned three tone correction methods will be described below with reference to the flowcharts shown in FIGS. 2 to 7.

After the image sensing apparatus 100 is activated, a shooting preparation operation such as an EVF image display operation is executed via initialization and activation of various devices, and the control waits for SW1 being turned ON by pressing the shutter switch 104 (S201). Upon detection of SW1 being turned ON, tentative determination processing of a D+ amount used in the D+ correction is executed (S203). The D+ amount tentative determination processing will be described below with reference to FIG. 3.

The image processing circuit 50 equally divides image data sensed by the image sensor 16 into, for example, four blocks in both the vertical and horizontal directions, and generates histograms for respective blocks to acquire a luminance distribution (S301). Note that the histogram may be generated for the entire frame but it is generated for each block to recognize a more detailed distribution state. The system controller 60 analyzes the luminance distribution especially on the high-luminance side of the histogram of each block, and estimates a degree of highlight-detail loss to be generated upon shooting without changing a current exposure value (S303). Then, the system controller 60 calculates a degree of suppression of the exposure value so as to suppress generation of a highlight-detail loss (S305). This degree will be referred to as a D+ amount hereinafter. Note that since the highlight-detail loss state of the entire image is to be estimated, the D+ amount obtained in this step will be referred to as a "whole D+ amount $DP_{ALL}$" hereinafter. In this embodiment, four steps of the whole D+ amount $DP_{ALL}$ are set according to the highlight-detail loss state of the entire image: no correction ($DP_{ALL}=0$), weak correction ($DP_{ALL}=$Low), middle correction ($DP_{ALL}=$Mild), and strong correction ($DP_{ALL}=$High).

The image recognition circuit 38 detects an object such as a human face which is set in advance (this object will be explained as a "human face" hereinafter) from the identical image data, and acquires face information including the presence/absence of a face, and the coordinates and size of a face region (S315). If the image recognition circuit 38 determines that the image does not include any face (NO in S317), the system controller 60 adopts the whole D+ amount $DP_{ALL}$ calculated in step S305 as a tentative D+ amount DP1 (S337). On the other hand, if the image recognition circuit 38 determines that the image includes a face (YES in S317), the image processing circuit 50 generates a histogram around a main face region to acquire a luminance distribution (S319). The system controller 60 then analyzes a high-luminance region of the luminance distribution around the face region to recognize a highlight-detail loss state limited to the face region (S321), and estimates a D+ amount according to this highlight-detail loss state (S323). Note that since this D+ amount is determined based on the highlight-detail loss state limited to the face region, it will be referred to as a "face D+ amount $DP_{Face}$" hereinafter. In this embodiment, four levels of the face D+ amount $DP_{Face}$ are set as in step S305: no correction ($DP_{Face}=0$), weak correction ($DP_{Face}=$Low), middle correction ($DP_{Face}=$Mild), and strong correction ($DP_{Face}=$High).

Note that the D+ amount is expressed by the number of steps: Low=⅓ steps, Mild=⅔ steps, and High=1 step in this embodiment.

Then, the system controller 60 compares the whole D+ amount $DP_{ALL}$ and face D+ amount $DP_{Face}$ (S335). As a result of comparison, if the whole D+ amount $DP_{ALL}$ is larger, the system controller 60 adopts the whole D+ amount $DP_{ALL}$ as a tentative D+ amount DP1 (S337); otherwise, it adopts the face D+ amount $DP_{Face}$ as a tentative D+ amount DP1 (S339).

Figure 2:
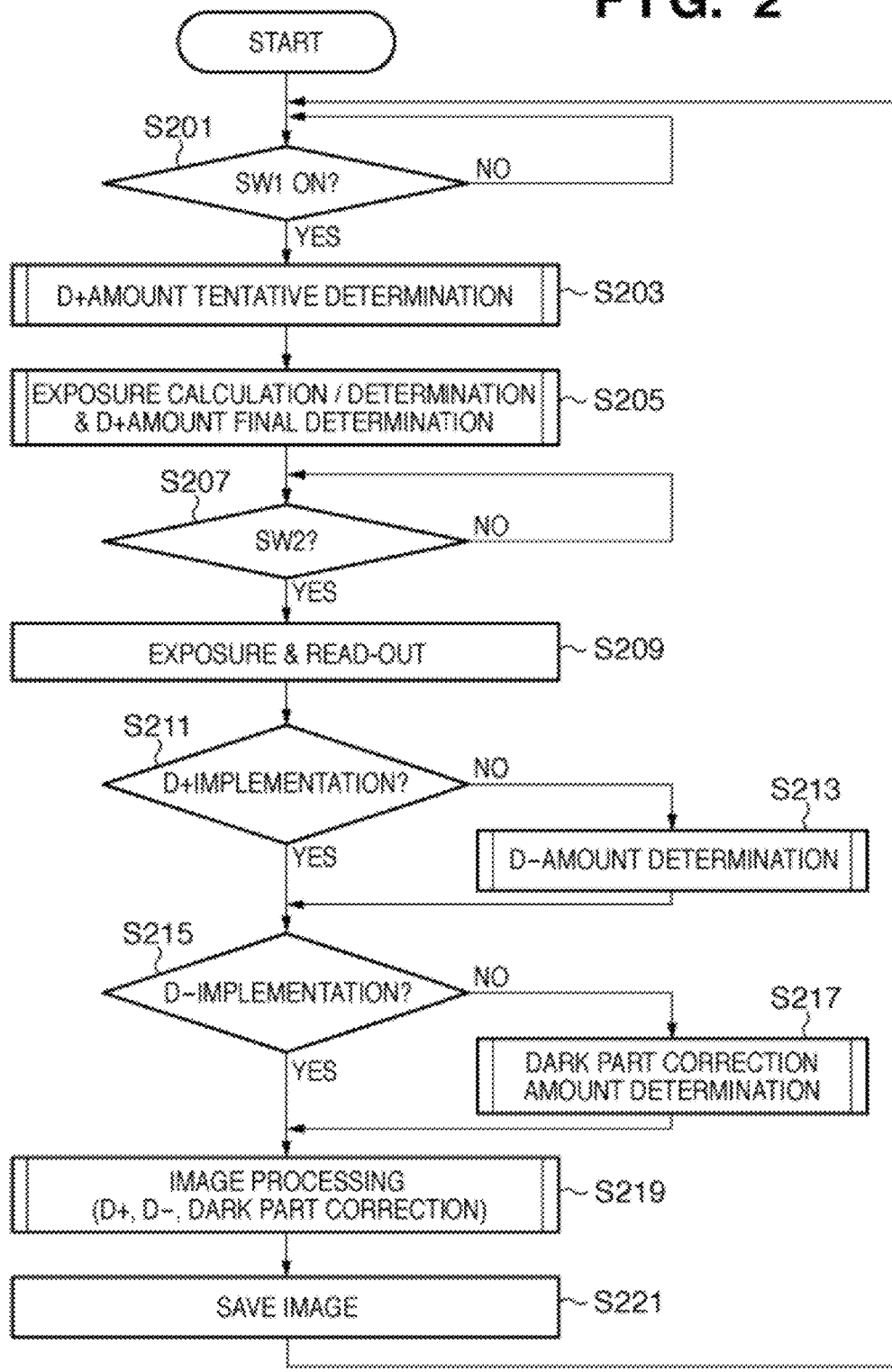
FIG. 2 is a flowchart showing the sequence of a tone correction method according to the embodiment of the present invention.
Figure 3:
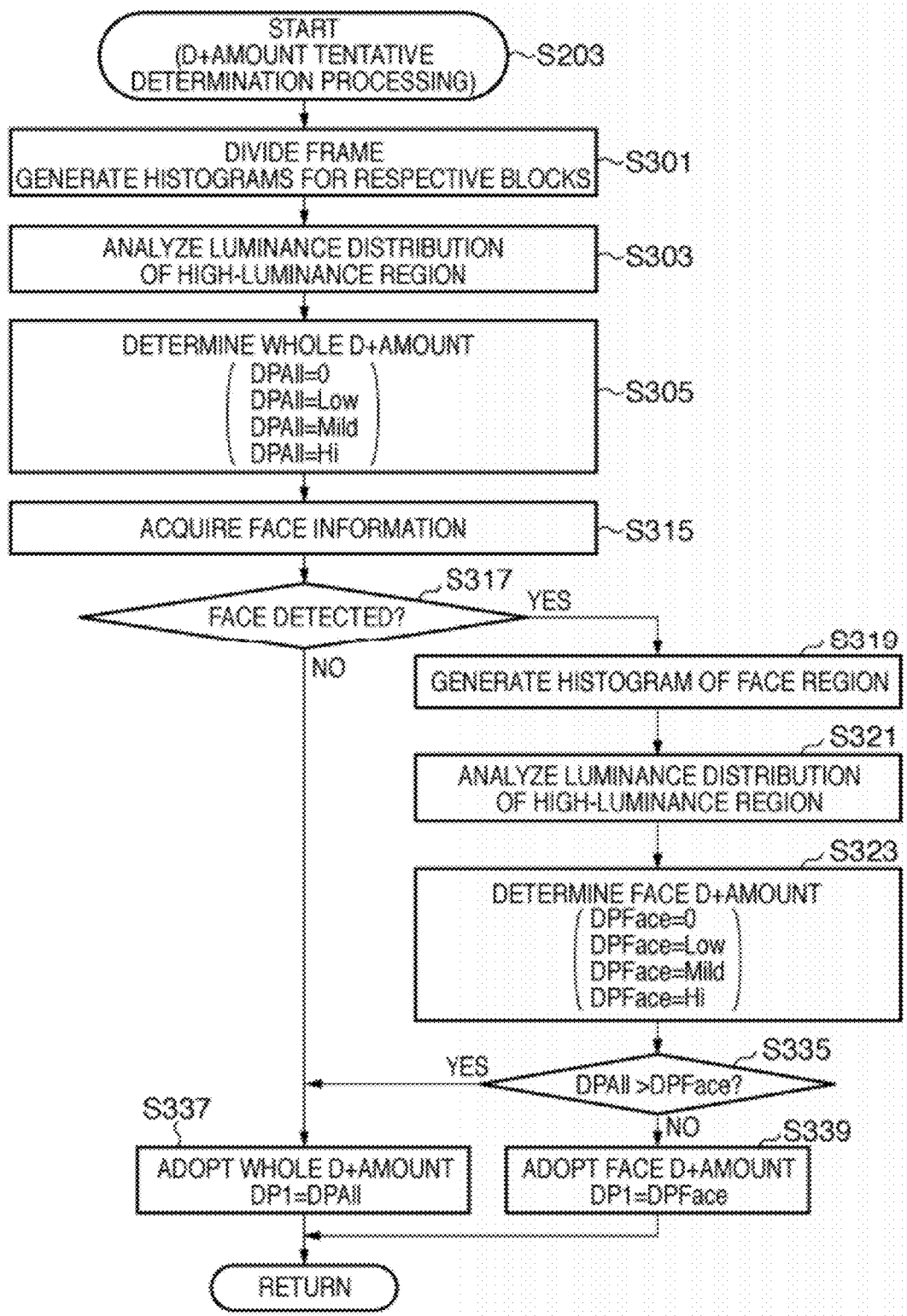
FIG. 3 is a flowchart showing D+ amount tentative determination processing according to the embodiment of the present invention.

Upon completion of the D+ amount tentative determination processing, the control returns to the processing shown in FIG. 2, and the process advances to step S205 to execute final determination processing for determining a final aperture value, shutter speed, gain, and D+ amount based on the tentative D+ amount DP1 calculated in FIG. 3 (S205). This final determination processing will be described below with reference to FIG. 4.

An object luminance value Bv1 is acquired from image data sensed by the image sensor 16 (S401). This object luminance value is calculated based on luminance integrated values of blocks obtained by dividing the frame into, for example, 24×16 blocks in the vertical and horizontal directions. In case of a photometry method like spot photometry which performs photometry of an arbitrary narrow region in the frame, the luminance value can be calculated from a luminance integrated value of one block at that position without dividing the frame into blocks. An exposure value Ev1 is calculated from the calculated object luminance value Bv1 and a shooting sensitivity value Sv, and an aperture value Av1, shutter speed Tv1, and gain Gain1 are calculated based on a known program chart table which expresses combinations of exposure values, aperture values, shutter speeds, and gains (S403). Note that different program charts may be provided in correspondence with different shooting modes.

The gain and shutter speed are adjusted so as to suppress an exposure value by the tentative D+ amount DP1 described in FIG. 3. The gain Gain1 calculated from the program chart is compared with the tentative D+ amount DP1 (S405). If the gain Gain1 is larger, a value obtained by subtracting the tentative D+ amount DP1 from the gain Gain1 is set as a new gain value Gain2 (S407). In this case, since the D+ amount can be set as an underexposure value by adjusting only the gain, the shutter speed Tv1 calculated from the program chart is adopted intact as a shutter speed Tv2 (S409). On the other hand, if the gain Gain1 is equal to or smaller than the tentative D+ amount DP1, an underexposure value by the tentative D+ amount DP1 cannot be set by adjusting only the gain. Hence, the gain is set to be a minimum value MinGain which can be set (S411). Subsequently, the shutter speed is increased to set an underexposure value by the tentative D+ amount DP1. In this case, the shutter speed Tv1 calculated from the program chart is increased by the number of steps for the value which cannot be adjusted by the gain, and is set as a shutter speed Tv2 (S413).

After the gain and shutter speed are adjusted to set an underexposure value by the tentative D+ amount DP1, as described above, it is checked if this exposure value is feasible (S415). An exposure limit in each shooting mode set in this image sensing apparatus 100 is determined based on a mechanical control limit, and different control limits may be set for respective modes. For this reason, it is checked if an exposure value defined by the aperture value, shutter speed, and gain exceeds an exposure limit MaxEv (an exposure value in a state in which the shutter speed cannot be increased any more or the gain cannot be decreased any more). If the exposure value does not exceed the limit, the tentative D+ amount DP1 is settled as a final D+ amount DP2 (S417).

Conversely, if the exposure value exceeds the limit, a value obtained by correcting the tentative D+ amount DP1 by an excess is settled as a final D+ amount DP2 (S419). This is the case when it is effective to apply the D+ correction but the D+ correction cannot be implemented since an object has a high luminance and the set exposure value is in the neighborhood of the exposure limit. When the D+ correction is not required, the tentative D+ amount DP1=0, which is always smaller than Gain1. For this reason, the values Av1, Tv1, and Gain1 calculated in step S403 are settled intact as an exposure value (Av1, Tv2, Gain2), and a D+ amount DP2=0 in the sequence of steps S405, S407, and S409.

FIG. 13 is a timing chart showing the timing of a vertical sync signal VD of the image sensor 16, the exposure timing on the image sensor 16, the accumulated charge read timing from the image sensor 16, the face detection timing, the histogram generation timing, the photometry block luminance detection timing, the D+ amount calculation timing, and the exposure value calculation timing before and after SW1 is turned ON. The exposure and accumulated charge read processes are executed for respective vertical periods. FIG. 13 depicts that the face detection process is executed at a cycle of once per two vertical periods. However, the present invention is not limited to this, and the detection cycle changes depending on the performance of the image recognition processing by the image recognition circuit 38. As for histogram generation process, since the D+ amount calculation process is to be executed using the face detection result and histogram generation result based on image data obtained by an identical exposure process, the histogram generation cycle is controlled in correspondence with the face detection cycle.

Figure 4:
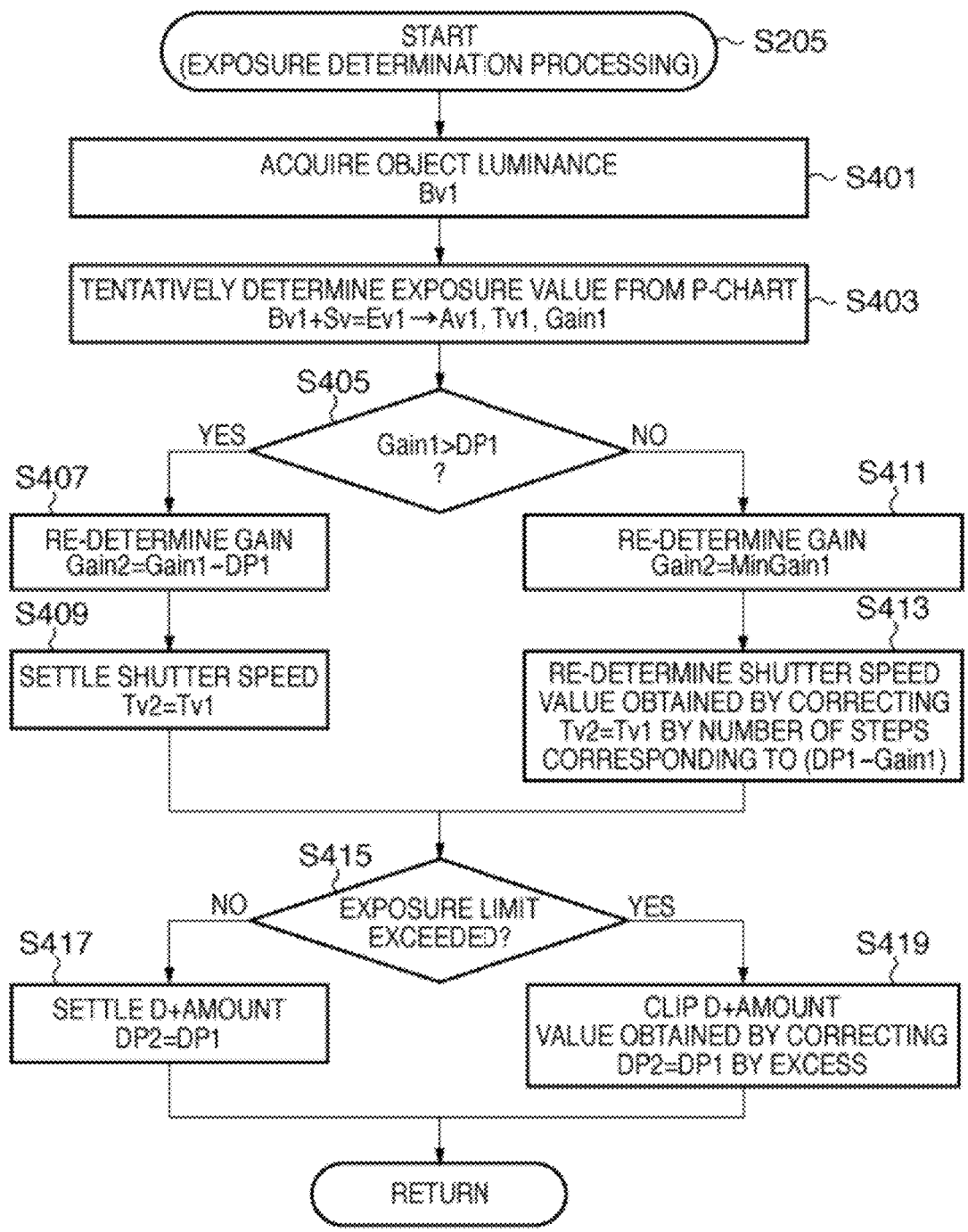
FIG. 4 is a flowchart showing determination processing of an aperture value, shutter speed, gain, and D+ amount according to the embodiment of the present invention.
Figure 5:
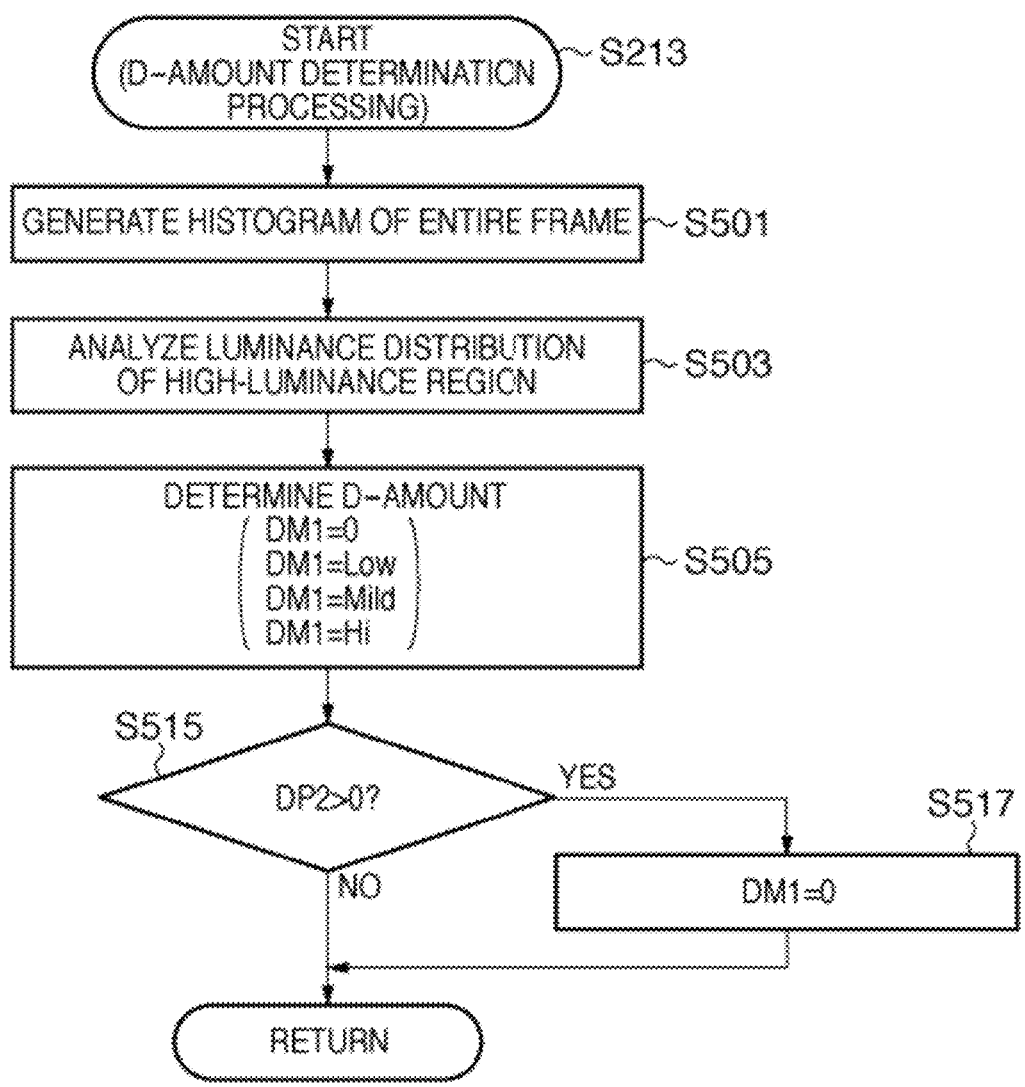
FIG. 5 is a flowchart showing D− amount determination processing according to the embodiment of the present invention.
Figure 6:
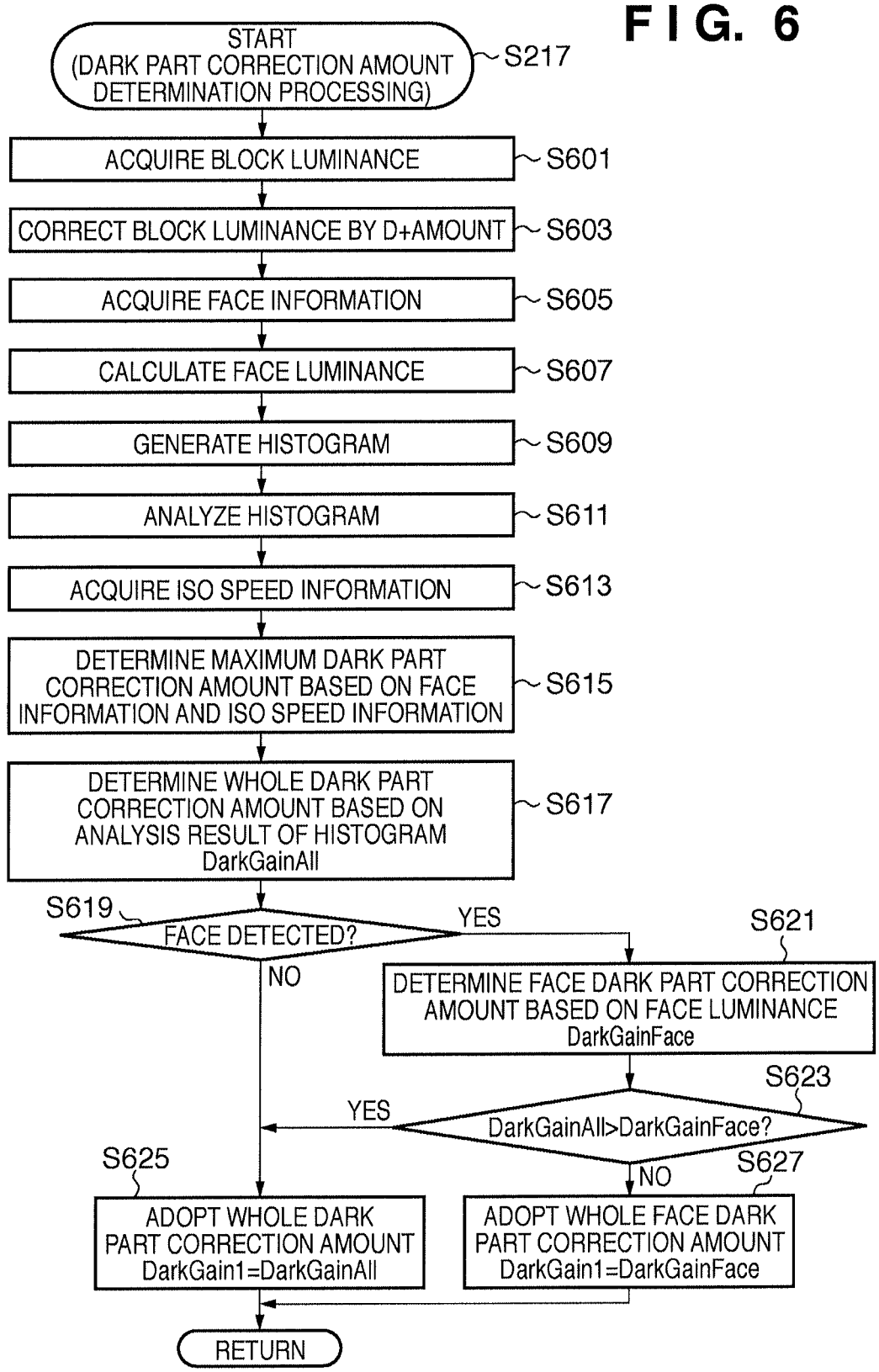
FIG. 6 is a flowchart showing dark part correction amount determination processing according to the embodiment of the present invention.

Under the aforementioned relationship, when SW1 it turned ON, the D+ calculation process is executed using a face detection result F5 detected at the immediately preceding timing and histograms F5 generated from image data F5. In a D+ amount tentative determination process 511, the processing described with reference to FIG. 3 is executed. After completion of the D+ amount tentative determination process 511, a final determination process of an aperture value, shutter speed, gain, and D+ amount is executed (513). In AE control, a photometry result calculated based on frame-divided block luminance values similarly detected from the image data F is used. In the exposure value calculation process 513, the processing described with reference to FIG. 4 is executed.

After the aperture value, shutter speed, gain, and D+ amount for the D+ correction are settled, as described above, the control returns to FIG. 2 to wait for SW2 being turned ON (S207). Upon detection of SW2 being turned ON, the image sensor 16 is exposed using the exposure value calculated in step S205, and charges are read out after an elapse of an exposure time and are converted into image data (S209). It is then checked based on the D+ amount DP2 determined in step S205 if the D+ correction is applied to the obtained image data (S211). More specifically, it is checked if the D+ amount DP2>0. If the D+ correction is not applied (i.e., DP2=0), D− amount determination processing is executed (S213). The D− amount determination processing will be described below with reference to FIG. 5.

The image processing circuit 50 generates a histogram of the entire frame from image data sensed by the image sensor 16 (S501). The system controller 60 analyzes especially the state of a high-luminance region of luminance distribution information obtained from this histogram to recognize how many data exist in the high-luminance region. Then, the system controller 60 analyzes the degree of region which does not require any gamma output luminance assignment, and determines a D− amount DM1 according to the degree of region which does not require any gamma output luminance assignment (S505). In this embodiment, four steps of D− amount DM1 are set depending on the degrees of region which does not require any gamma output luminance assignment: no correction (DM1=0), weak correction (DM1=Low), middle correction (DM1=Mild), and strong correction (DM1=High). Note that the D− amount is expressed by the number of steps: Low=⅓ steps, Mild=⅔ steps, and High=1 step in this embodiment.

Then, it is checked again if the D+ amount DP2 calculated in step S205 is larger than 0, that is, if the D+ correction is to be applied (S515). If the D+ correction is not applied, the amount DM1 determined in step S505 is settled as a D− amount; otherwise, the amount DM1 is set to be 0 for confirmation so as not to apply the D− correction (S517). In this way, in this embodiment, the D− correction is not applied at the time of implementation of the D+ correction. This is because it is difficult to assume a scene which requires the D+ correction and D− correction at the same time. The D+ correction is applied to a scene which may generate a highlight-detail loss due to high luminance. When the exposure value is determined to attain underexposure so as to avoid any high-light-detail loss, as described above using FIG. 4, a histogram which includes a luminance distribution up to the limit of a high-luminance region is assumed. The D− correction is not required to be applied to image data having such histogram.

After the D− amount is settled, as described above, the control returns to the processing in FIG. 2. It is checked in step S215 if the D− correction is implemented (S215). As described above, since the D− correction is skipped when the D+ correction is implemented, if YES in step S211, NO is determined in this step. If the D− value DM1=0 set in step S213, it is determined that the D− correction is not implemented. If the D− value DM1≠0, it is determined that the D− correction is implemented. If the D− correction is not implemented, dark part correction amount determination processing is executed (S217). On the other hand, if the D− correction is implemented, the dark part correction is skipped. This is because both the D− correction and dark part correction have an effect of raising a luminance level, and if it is determined that both the correction processes are to be applied, an image may be corrected beyond necessity, and an excessively bright image may be formed. On the other hand, since a scene to which the D− correction is to be applied does not include any luminance distribution in a high-luminance region, it is unlikely to be a scene including a large luminance difference like a backlight scene, and it is assumed as a scene which does not require any dark part correction. The dark part correction amount determination processing executed in step S217 will be described below with reference to FIG. 6.

The image processing circuit 50 divides image data sensed by the image sensor 16 into a plurality of blocks, and calculates integrated values for respective blocks to acquire block luminance values (S601). The calculated block luminance values undergo simple luminance correction using the D+ amount DP2 calculated in step S205 (S602). This is because image data which is read out from the image sensor 16 is underexposed by the D+ amount when the D+ correction is applied, and simple luminance correction is applied to restore an original luminance level. Subsequently, the image recognition circuit 38 acquires face information including the presence/absence of a face, face coordinates, and a face size from the luminance-corrected image data (S605). The image processing circuit 50 calculates a luminance value around the face (face luminance value) based on the acquired face information and block luminance values (S607), and generates a histogram for the entire frame (S609). The system controller 60 analyzes the degree of luminance distribution in a low-luminance region from the histogram of the entire frame (S611). When a low-luminance region does not include any luminance distribution, the dark part correction is not required. Hence, this analysis result is used to check if the dark part correction is required. Then, ISO speed (gain) information is acquired as an exposure condition (S613). The dark part correction is done to obtain an effect of amplifying pixel levels having a low luminance level. However, owing to the low luminance level, image quality deterioration readily occurs due to S/N degradation. In case of image data which is originally obtained at a high ISO speed (high gain), since the S/N may already be degraded, the ISO speed information is acquired to check according to the gain value if the dark part correction is to be suppressed.

The system controller 60 determines a maximum dark part correction amount based on various kinds of acquired information (S615). When a human face is detected, if the excessively large dark part correction is applied even in a backlight scene, the S/N of the human face may be degraded, and a poor impression image may be formed. For this reason, the maximum dark part correction amount is determined also in consideration of the ISO speed information so as to detect the original S/N of the image data, as described above.

The system controller 60 determines a degree of dark part correction to be implemented for the whole frame based on the histogram analysis result and maximum dark part correction amount (S617). Assume that the correction amount determined in this step will be referred to as a whole dark part correction amount DarkGainAll. Then, the system controller 60 checks the presence/absence of a face (S619). If no face is detected, the system controller 60 adopts the whole dark part correction amount DarkGainAll calculated in the previous step as a dark part correction amount DarkGain1 (S625). On the other hand, if a face is detected, the system controller 60 determines a face dark part correction amount DarkGainFace based on the face luminance value calculated in step S607 and the maximum dark part correction amount (S621). Then, the system controller 60 compares the whole dark part correction amount DarkGainAll and the face dark part correction amount DarkGainFace (S623), and adopts a larger correction amount as a dark part correction amount DarkGain1 (S625 or S627).

After the dark part correction amount DarkGain1 is determined, as described above, the control returns to the processing shown in FIG. 2. Since implementation/non-implementation of each correction and the correction amount at the time of implementation are determined by the processes until step S217, image processing is executed based on these pieces of information (S219), and corrected image data is saved in a memory card or the like. Details of the image processing executed in step S219 will be described below with reference to FIG. 7.

Whether or not DP2>0, that is, whether or not to apply the D+ correction is checked by referring to the D+ amount DP2 (S703). If the D+ correction is to be applied, a tone curve is determined based on the D+ amount DP2 (S707).

In a normal shooting mode, an image is sensed using an aperture value, shutter speed, and gain calculated in AF processing. In the D+ correction, as described above, the image sensor is underexposed by the calculated D+ amount with respect to this exposure condition, thus suppressing a highlight-detail loss. However, when an underexposure value is set to suppress a highlight-detail loss, the luminance levels of the entire frames become lower. Hence, by setting a tone curve to correct the luminance values of a luminance region which should not originally have low luminance values to be restored by an underexposed amount, a highlight-detail loss of a high-luminance region can be suppressed. The luminance level of a luminance region that does not suffer any highlight-detail loss does not become excessively dark, and a satisfactory result ought to be obtained.

Figure 12:
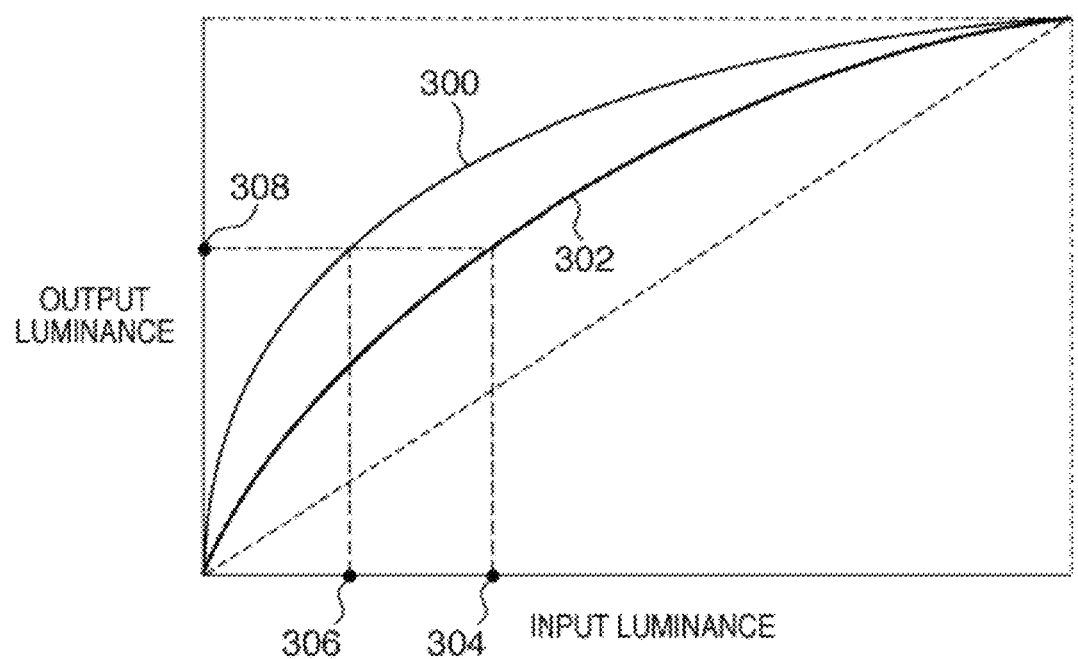
FIG. 12 is a graph showing an example of a tone curve used in the D+ correction according to the embodiment of the present invention.

FIG. 12 is a graph for explaining an example of a tone curve used in the D+ correction. FIG. 12 shows a D+ gamma curve 300 which applies the D+ correction for one step in contrast to the normal gamma curve 302 used upon skipping the D+ correction. When a certain input luminance value 304 obtained in the normal shooting mode with a proper exposure value without any D+ correction is converted using the normal gamma curve 302, an output luminance value 308 is obtained. By contrast, when an image is underexposed by the D+ amount (for one step), as described above with reference to FIG. 4, the input luminance value 304 corresponds to an input luminance value 306 having a half luminance level. Hence, in order to convert the input luminance value 306 having the half luminance level to the same output luminance value 308 as that obtained by shooting with the proper exposure value, it is converted by applying the D+ gamma curve 300. When an image is obtained using the underexposure value, a highlight-detail loss ought to be suppressed in a high-luminance region. Then, as indicated by the D+ gamma curve 300, a luminance level is raised in a low-luminance part, and the curve is set to gradually have a smaller gradient toward a high-luminance region, thus obtaining output luminance values while a highlight-detail loss is kept suppressed. Note that FIG. 12 depicts the gamma curve when the D+ amount for one step is set. However, the present invention is not limited to this, and the D+ amount can be set in finer steps like ⅓ steps and ⅔ steps. In this case, gamma curves according to respective D+ amounts have to be set. As described above, a method of preparing a plurality of different types of tone curves in advance in correspondence with the D+ amounts, and selecting an appropriate tone curve from these curves may be used. However, a tone curve may be calculated based on the D+ amount.

When the D+ correction is skipped (NO in S703), whether or not DM1>0, that is, whether or not to apply the D− correction is checked by referring to the D− amount DM1 (S705). If the D− correction is to be applied, a tone curve is determined based on the D− amount DM1 with reference to FIGS. 8A and 8B, as described above (S709). This tone curve may be selected from a plurality of D− tone curves or may be calculated based on the D− amount in the same manner as the D+ correction tone curve.

When neither the D+ correction nor the D− correction are applied, it is determined that no specific tone correction is required, and a default tone curve (for example, the normal gamma curve 302) is selected (S711). Using any tone curve selected in this way, tone curve processing is applied to image data (S713).

After that, the D− amount DM1 is referred to so as to check whether or not to apply the dark part correction (S715). If DM1>0 does not hold (i.e., the D− correction is not applied), implementation of the dark part correction is permitted, and a dark part correction tone curve is determined based on the dark part correction amount DarkGain1 calculated in step S217 (S717). Using this tone curve, dark part correction processing is executed (S719). The dark part correction processing is executed to correct the luminance level of a low-luminance frequency and low-luminance region to be brighter using low-resolution images shown in FIGS. 10A to 10C and the dark correction tone curve shown in FIG. 11.

In this way, since the low-resolution image and dark part correction tone curve processes described above with reference to FIGS. 10A to 10C and FIG. 11 are executed using the dark part correction amount DarkGain1, the luminance level of a dark part can be corrected without losing any contrast.

On the other hand, when the D− correction is applied, implementation of the dark part correction is limited. In this embodiment, implementation is not permitted, and the processing ends.

FIG. 14 is a timing chart of the tone correction processing shown in FIG. 7 after SW2 is turned ON. After SW2 is turned ON, a charge signal (554) read out after exposing the image sensor 16 is saved in the temporary storage memory 30 as image data (556). At the same time, luminance detection (558), face detection (560), and luminance/low-frequency detection (562) are executed. The dark part correction amount or D− amount are calculated based on these detection results (564), and the image processing circuit 50 executes tone correction (566).

As described above, according to this embodiment, in an image sensing apparatus which can execute a plurality of tone correction methods respectively suited to different luminance distributions of images, whether or not to implement the plurality of tone correction methods is checked according to the luminance distribution of a sensed image. A proper tone curve is set based on the D+ amount, D− amount, and/or dark part correction amount of the tone correction method to be executed to apply correction, thus obtaining an image having a satisfactory contrast and brightness. In particular, concurrent application of the D− correction and dark part correction which have an effect of raising the luminance level is limited. Since an image which is excessively bright due to overcorrection can be avoided from being formed, any image quality drop can be prevented.

<Modification>

In the above embodiment, implementation of the dark part correction is not permitted upon application of the D− correction. However, an application amount of the dark part correction may be limited in such case. In this case, after it is determined in step S715 in FIG. 7 that DM1>0, the same processes as in steps S717 and S719 are executed. In these steps, however, a gamma curve which has a smaller change than the dark part correction gamma curve shown in FIG. 11 is determined, and the correction is applied based on this curve. That is, a gamma curve which has a smaller gain difference between luminance regions than that when the D− correction is skipped is set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-034391, filed on Feb. 17, 2009, which is hereby incorporated by reference herein in its entirety.

What is claimed is:

1. An image sensing apparatus comprising:
a first tone correction unit which applies a tone correction that suppresses luminance saturation of image data;
a second tone correction unit which applies a tone correction by converting luminance values of all luminance regions so that a maximum luminance value of sensed image data becomes a largest possible luminance value of the image data;
a third tone correction unit which applies a tone correction by multiplying a luminance value of a low-luminance region, which is set in advance, of sensed image data by a gain larger than gains of other luminance regions;
an analysis unit which analyzes a luminance distribution of sensed image data;
a selection unit which selects at least one of tone corrections applied by said first, second, and third tone correction units as the tone correction to be implemented for sensed image data based on an analysis result of said analysis unit; and
a limiting unit which limits, when the tone correction by said second tone correction unit is selected, implementation of the tone correction by said third tone correction unit.

2. The apparatus according to claim 1, further comprising:
an exposure determination unit which determines an exposure value used in next shooting based on the sensed image data,
wherein said first tone correction unit changes the determined exposure value to be smaller so as to suppress the luminance saturation, and corrects sensed image data based on the changed exposure value using a tone curve which is set in accordance with the changed exposure value.

3. The apparatus according to claim 1, wherein when said selection unit selects said first tone correction unit, said selection unit does not select said second tone correction unit.

4. The apparatus according to claim 1, wherein when said selection unit selects said second tone correction unit, said limiting unit inhibits said selection unit from selecting said third tone correction unit.

5. The apparatus according to claim 1, wherein when said selection unit selects said second tone correction unit and said third tone correction unit, said limiting unit controls said third tone correction unit to apply a correction based on a smaller correction amount than a case in which said second tone correction unit is not selected.

6. An image processing method, which executes a plurality of tone correction methods respectively suited to different luminance distributions of images, comprising:
an analysis step of analyzing a luminance distribution of sensed image data;
a selection step of selecting, based on an analysis result in the analysis step, a first tone correction which suppresses luminance saturation of image data, a second tone correction which converts luminance values of all luminance regions so that a maximum luminance value of sensed image data becomes a largest possible luminance value of the image data, and a third tone correction which multiplies a luminance value of a low-luminance region, which is set in advance, of sensed image data by a gain larger than gains of other luminance regions, as a tone correction to be implemented for sensed image data; and
a limiting step of limiting, when a correction based on the second tone correction is selected, implementation of a correction based on the third tone correction.

7. An image sensing apparatus comprising:
a wide range correction unit which applies a tone correction by correcting luminance values of luminance regions from low-luminance region to high-luminance region of sensed image data in accordance with a distribution of high-luminance region of the image data;
a low-luminance range correction unit which applies a tone correction by multiplying a luminance value of a low-luminance region of sensed image data by a gain larger than gains of other luminance regions in accordance with a distribution of low-luminance region of the image data;
an analysis unit which analyzes a luminance distribution of sensed image data; and
a control unit which controls the tone correction to be implemented for sensed image data based on an analysis result of said analysis unit,
wherein said control unit limits, when the tone correction by said wide range correction unit is implemented, implementation of the tone correction by said low-luminance range correction unit.

8. The apparatus according to claim 7, wherein said wide range correction unit applies the tone correction in accordance with a maximum luminance value of the image data.

9. The apparatus according to claim 7, wherein said wide range correction unit applies the tone correction by correcting luminance values of luminance regions from low-luminance region to high-luminance region of sensed image data using one tone curve selected from a plurality of tone curves which are previously reserved.

10. The apparatus according to claim 7, wherein said low-luminance range correction unit applies the tone correction to low frequency elements of the image data.

11. An image processing method comprising:
an analysis step of analyzing a luminance distribution of sensed image data; and
a control step of controlling tone corrections to be implemented for sensed image data based on an analysis result of said analysis step, wherein tone corrections include a wide range tone correction of correcting luminance values of luminance regions from low-luminance region to high-luminance region of sensed image data in accordance with a distribution of high-luminance region of the image data and a low-luminance range tone correction of multiplying a luminance value of a low-luminance region of sensed image data by a gain larger than gains of other luminance regions in accordance with a distribution of low-luminance region of the image data,
wherein said control step limits, when the wide range tone correction is implemented, implementation of the low-luminance range tone correction.

12. The method according to claim 11, wherein the wide range tone correction is implemented in accordance with a maximum luminance value of the image data.

13. The method according to claim 11, wherein, in the wide range tone correction, the luminance values of luminance regions from low-luminance region to high-luminance region of sensed image data is corrected using one tone curve selected from a plurality of tone curves which are previously reserved.

14. The method according to claim 11, wherein the low-luminance range tone correction is applied to low frequency elements of the image data.

15. An image sensing apparatus comprising:
a first determination unit which determines a first correction data that corrects a luminance value of a low-luminance region of sensed image data and does not correct a luminance value of a high-luminance region of sensed image data;
a second determination unit which determines a second correction data that corrects luminance values of luminance regions including the low-luminance region and the high-luminance region of sensed image data;
a control unit which controls a tone correction for the sensed image data so that when one of the first correction data and the second correction data is used by said control unit in the tone correction, the other of the first correction data and the second correction data is limited by said control unit from being used in the tone correction.

16. The apparatus according to claim 15, wherein the first determination unit determines the first correction data in accordance with a luminance distribution of sensed image data.

17. The apparatus according to claim 15, wherein the second determination unit determines the second correction data in accordance with a luminance distribution of sensed image data.

18. The apparatus according to claim 15, wherein the first determination unit determines the first correction data in accordance with the luminance value of the low-luminance region of sensed image data.

19. The apparatus according to claim 15, wherein the second determination unit determines the second correction data in accordance with the luminance value of the high- luminance region of sensed image data.

20. The apparatus according to claim 19, wherein the luminance value of the high- luminance region of sensed image data not a saturated value.

21. An image sensing method comprising:
a first determination step of determining a first correction data that corrects a luminance value of a low-luminance region of sensed image data and does not correct a luminance value of a high-luminance region of sensed image data;
a second determination step of determining a second correction data that corrects luminance values of luminance regions including the low-luminance region and the high-luminance region of sensed image data;
a control step of controlling a tone correction for the sensed image data so that when one of the first correction data and the second correction data is used in the control step for the tone correction, the other of the first correction data and the second correction data is limited in the control step from being used in the tone correction.

* * * * *